Oct. 18, 1927.

H. J. SEWELL ET AL 1,646,172

STEERING WHEEL

Filed April 1, 1925

INVENTORS
Herbert J. Sewell and Lester C. Wilking
BY
Francis D. Hardesty
their ATTORNEY Patented Oct. 18, 1927.

1,646,172

UNITED STATES PATENT OFFICE.

HERBERT J. SEWELL AND LESTER C. WILKING, OF DETROIT, MICHIGAN, ASSIGNORS TO SEWELL CUSHION WHEEL COMPANY, OF DETROIT, MICHIGAN, A CORPORATION OF DELAWARE.

STEERING WHEEL.

Application filed April 1, 1925. Serial No. 19,802.

The present invention relates to steering wheels, particularly to wheels having wooden spiders, and has among its objects a wheel of greater elasticity than has heretofore been secured in such wheels, yet stronger and cheaper without sacrifice of appearance.

Another object is strong, compact, reliable means for attaching a wooden spider to a metal hub member whereby the wheel may be in turn secured to the shaft.

Heretofore, in the production of such wheels the spiders have usually been made of four spokes, each of a single piece of wood formed to the desired shape, set in the rim in a suitable manner and joined at the hub by some kind of interlocking joint, the hub member then being secured by bolting flanges to both sides of the spider. This method is expensive and often unsightly.

The present wheel is, on the other hand, made up of a conventional rim with a spider of laminated construction, the laminations being secured together by a suitable adhesive and pressed to proper form before and during the adhesive's setting. The hub member is then attached by a sort of spline joint and secured in place by a single nut.

The wheel may be more clearly and fully described by referring to the accompanying drawing, in which:—

Figure 1:
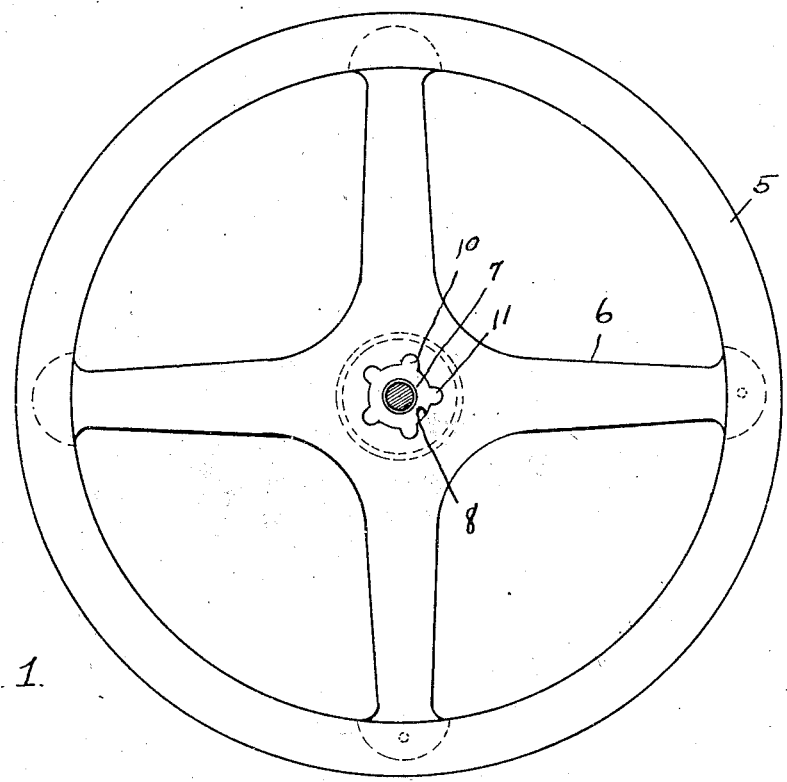
Fig. 1 is a plan view of the wheel with certain parts removed.

In the drawings the wheel is illustrated as being composed of a rim 5 which may be of any suitable structure or composition, a spider 6 and a hub member 7.

Figure 2:
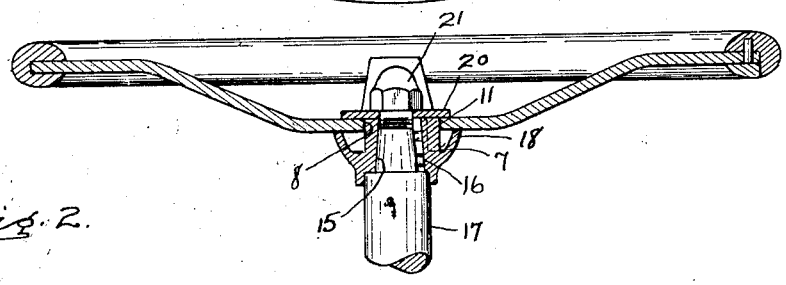
Fig. 2 is a sectional view of the wheel on line 2—2 of Fig. 1.
Figure 3:
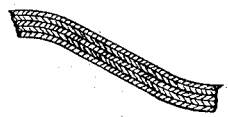
Fig. 3 is a sectional view of a portion of one of the spokes showing the laminated structure.

In the preferred form the spider is made up of a plurality of layers of thin wood veneer as is indicated in Fig. 3. These layers of wood veneer are first coated with a suitable adhesive and superposed in a mold or form, not shown, which presses them together and at the same time gives them the dished form indicated clearly in Fig. 2.

The central portion of the spider, which is made integral with the spokes in the manner just described, is of comparatively large area and is provided with a central opening which is splined as indicated in Fig. 1. This opening is produced by boring a plurality of small holes about the periphery of the circle and subsequently with a large cutter cutting out the larger circle. This produces a circular opening 8 having what are really splines 10 about its circumference.

Adapted to fit in the opening 8 just described is a hub member which has a cylindrical portion provided with longitudinal ribs or splines 11 of such shape as to fit snugly in splines 10. This hub member may be, and preferably is, a casting and is provided with an axial conical bore 15 provided with a keyway 16 so that it may be fixed to the top of a steering shaft 17.

In order to limit the movement of the spider longitudinally of the hub member, there is provided a cup-shaped flange 18 which extends from the lower portion of the hub member. This cup-shaped portion is circular in form and is of somewhat larger diameter than the ribbed portion of the hub member. The cup 18 also does not extend up as far as the top of the ribs 11 but is intended to form a support for the lower side of the spider 6.

In assembling the wheel and hub and steering shaft, the hub member is first slipped over the end of the steering shaft 17 and the spider placed upon it in the manner indicated in the drawings, the spider being supported upon the upper edge of the cup 18. When this has been done, a washer or plate 20 is placed on top of the spider and the several parts secured together by means of a nut 21 threaded upon the end of the shaft 17. This plate 20 is of sufficient size to completely cover the splined opening and the dimensions of the parts are such that tightening of the nut 21 will draw them tightly together.

The forming of the spider with the splined central opening co-operating with the splined hub member provides a simple, cheap, and effective means for locking the wheel against turning on the hub member and the cup shaped portion of the hub member together with the upper plate effectually clamp the spider to the hub member with a minimum of parts and difficulty. The advantage of this will readily be seen when it is compared with the ordinary structure wherein the hub member is provided with a flange and six or more through bolts used to clamp this flange, the spider, and a ring on the other side of the spider, together.

Further, the superior elasticity of this form of spider is due to the laminated structures of the spokes and to the structure is also due its great strength. By making the spider integral there are no joints to open under strain and by crossing the grain of the several laminations, there is no possibility of splitting, as may occur with spokes of single pieces of wood.

We claim:—

1. In combination with a steering wheel spider having a splined central opening, a correspondingly splined hub member having a cup-shaped portion surrounding the splines and spaced therefrom, said cup-shaped portion being constructed and arranged to have its edge form a support for the under side of said spider.

2. In combination with a steering wheel spider having a splined central opening, a correspondingly splined hub member having a circular cup-shaped portion surrounding the splines and spaced therefrom, said cup-shaped portion being constructed and arranged to have its edge form a support for the under side of said spider.

3. In combination with a steering wheel spider having a splined central opening, a correspondingly splined hub member having a circular cup-shaped portion surrounding the splines and spaced therefrom, said cup-shaped portion being constructed and arranged to have its edge form a support for the under side of said spider, the upper rim of said cup being below the upper end of the splined portion of the hub member.

4. A steering wheel having a molded dished laminated integral wood spider consisting of spokes and a central portion of comparatively large area having a splined central opening therein, a corresondingly splined hub member in said opening, said hub member having a tapered bore therethrough, and a plate upon the upper side of said spider adapted to conceal the splined portions and hold the parts in assembled relation when said wheel is mounted upon a steering shaft.

HERBERT J. SEWELL.
LESTER C. WILKING.